(12) United States Patent
Nishimura et al.

(10) Patent No.: US 10,128,754 B2
(45) Date of Patent: Nov. 13, 2018

(54) POWER CONVERSION APPARATUS

(71) Applicant: Mitsubishi Electric Corporation, Chiyoda-ku, Tokyo (JP)

(72) Inventors: Kengo Nishimura, Tokyo (JP); Satoshi Ishibashi, Tokyo (JP); Yuta Komatsu, Tokyo (JP); Satoshi Murakami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 8 days.

(21) Appl. No.: 15/450,148

(22) Filed: Mar. 6, 2017

(65) Prior Publication Data

US 2017/0373598 A1    Dec. 28, 2017

(30) Foreign Application Priority Data

Jun. 28, 2016  (JP) ................. 2016-127205

(51) Int. Cl.
| | |
|---|---|
| *H02M 3/158* | (2006.01) |
| *H02M 1/12* | (2006.01) |
| *H02M 1/08* | (2006.01) |

(52) U.S. Cl.
CPC ............ *H02M 3/158* (2013.01); *H02M 1/08* (2013.01); *H02M 1/126* (2013.01)

(58) Field of Classification Search
CPC .. G05F 1/445; G05F 1/561; G05F 3/22; H02J 7/35; H02M 3/1584; H02M 3/158; H02M 1/08; H02M 1/126

See application file for complete search history.

(56) References Cited

U.S. PATENT DOCUMENTS 9,318,974 B2 *  4/2016  Yoscovich ............ H02M 7/537

FOREIGN PATENT DOCUMENTS

| JP | 2004-023825 A | 1/2004 |
|---|---|---|
| JP | 2006-136058 A | 5/2006 |
| JP | 2011-210753 A | 10/2011 |

* cited by examiner

*Primary Examiner* — Nguyen Tran
*Assistant Examiner* — Monica Mata
(74) *Attorney, Agent, or Firm* — Sughre Mion, PLLC; Richard C. Turner

(57) ABSTRACT

In a power conversion apparatus including first to fourth semiconductor switching elements connected in series across both terminals of a high voltage-side capacitor, the third and fourth semiconductor switching elements are connected across both terminals of a low voltage-side capacitor via a reactor, and both terminals of the second and third semiconductor switching elements are connected across a charging-discharging capacitor. This charging-discharging capacitor includes a plurality of capacitor elements connected in parallel via a first wiring and a second wiring. Inductance components or capacitance components of the plurality of capacitor elements when viewed from an outflow-inflow portion of the first wiring and an outflow-inflow portion of the second wiring are different from each other such that the charging-discharging capacitor does not have a parallel resonance point in a driving frequency band but has a parallel resonance point in a noise frequency band.

14 Claims, 15 Drawing Sheets

POWER CONVERSION APPARATUS

BACKGROUND OF THE INVENTION

1. Field of the Invention

The present invention relates to a power conversion apparatus, and more particularly, to an apparatus configured to perform power conversion, e.g., DC/DC power conversion using a switching element.

2. Description of the Related Art

A noise reduction technology of a power conversion apparatus configured to perform high speed switching operation at a high voltage becomes required.

As a related-art power conversion apparatus, there exists an apparatus including: an input terminal for inputting an input voltage and an output terminal for outputting an output voltage, in which power conversion processing is performed between the input terminal and the output terminal; a switching element used for the power conversion processing; and a fluctuation suppression circuit configured to suppress voltage fluctuations at the input terminal or the output terminal accompanying operation of the switching element, in which the fluctuation suppression circuit includes a parallel resonance circuit configured to resonate at a predetermined resonance frequency (see, for example, Japanese Patent Application Laid-open No. 2004-23825).

Further, as an example of a noise filter for reducing noise generated in a power conversion apparatus, there exists a filter including: a common mode transformer that includes a primary winding inserted in series to a power supply line on an input side of a power conversion apparatus and a secondary winding electromagnetically coupled to the primary winding; a capacitor connected between terminals of the secondary winding of the common mode transformer; and ground capacitors connected between a power supply line connecting the common mode transformer and the power conversion apparatus and the ground, in which a resonance frequency generated by an LC parallel resonance circuit including the secondary winding of the common mode transformer and the capacitor is set in a frequency band of common mode noise (see, for example, Japanese Patent Application Laid-open No. 2006-136058).

Further, there exists a power conversion apparatus including a boosting toroidal coil for a power-factor improving circuit having a winding that is folded over and wrapped at least at a part of a bobbin such that an overlapping winding immediately above is not wrapped in the same direction (see, for example, Japanese Patent Application Laid-open No. 2011-210753).

However, in the power conversion apparatus described in Japanese Patent Application Laid-open No. 2004-23825, an EMI filter is included separately from a full-wave rectifier circuit, a harmonic suppression circuit, a switching circuit, and a smoothing circuit that are in charge of power conversion operation, and thus, the apparatus is increased in size.

Further, in the noise filter described in Japanese Patent Application Laid-open No. 2006-136058, the noise filter is added outside the power conversion apparatus, and thus, similarly to the case of Japanese Patent Application Laid-open No. 2004-23825, the power conversion apparatus is increased in size.

Further, in an AC/DC converter described in Japanese Patent Application Laid-open No. 2011-210753, a parallel resonance is caused by a stray capacitance between the boosting coil and the winding, and thus, a frequency band that can suppress noise is limited to a relatively high frequency at which noise due to a surge voltage of a semiconductor switching element is generated. As a result, for example, noise in a relatively low frequency band in the vicinity of a driving frequency of the semiconductor switching element cannot be reduced. Further, noise reduction in this frequency band requires securement of a relatively large inductance component or capacitance component, with the result that the apparatus is increased in size due to addition of an external filter or the like.

SUMMARY OF THE INVENTION

The present invention has been made to solve the problems described above. It is accordingly an object of the present invention to provide a power conversion apparatus configured to reduce noise in a desired frequency band without the addition of a noise filter outside the apparatus.

For achieving the above object, the present invention provides a power conversion apparatus, comprising: a plurality of semiconductor switching elements; a reactor; a low voltage-side capacitor; a high voltage-side capacitor; a charging-discharging capacitor; and a control unit configured to control driving of the plurality of semiconductor switching elements at a set driving frequency, the plurality of semiconductor switching elements comprising: a first semiconductor switching element including a first terminal connected to a negative electrode of the low voltage-side capacitor; a second semiconductor switching element including a first terminal connected to a second terminal of the first semiconductor switching element and a second terminal connected to a positive electrode of the low voltage-side capacitor via the reactor; a third semiconductor switching element including a first terminal connected to the second terminal of the second semiconductor switching element; and a fourth semiconductor switching element including a first terminal connected to a second terminal of the third semiconductor switching element and a second terminal connected to a positive electrode of the high voltage-side capacitor, the charging-discharging capacitor being connected between a junction point of the first semiconductor switching element with the second semiconductor switching element and a junction point of the third semiconductor switching element with the fourth semiconductor switching element, the charging-discharging capacitor having a plurality of capacitor elements connected in parallel via a first wiring and a second wiring, at least one of inductance components and capacitance components of the plurality of capacitor elements at the time when viewed from outflow-inflow portions of the first wiring and the second wiring being different from each other such that the charging-discharging capacitor has no parallel resonance point in a driving frequency band but has a parallel resonance point in a noise frequency band.

According to the power conversion apparatus of the present invention, the charging-discharging capacitor including the plurality of capacitor elements connected in parallel via the first wiring and the second wiring is formed so that at least one of the inductance components and the capacitance components of the plurality of capacitor elements at the time when viewed from the outflow-inflow portions of the first wiring and the second wiring is different from each other, such that the charging-discharging capacitor has no parallel resonance point in the driving frequency band but has a parallel resonance point in the noise frequency band. Thus, noise in a desired frequency band including a relatively low frequency band in the vicinity of the driving frequency of the semiconductor switching elements can be reduced without the addition of a noise filter outside the apparatus.

BRIEF DESCRIPTION OF THE DRAWINGS

FIG. 2A and FIG. 2B are outline views of Example 1 of a charging-discharging capacitor used in the power conversion apparatus illustrated in FIG. 1, wherein FIG. 2A is a perspective view of the charging-discharging capacitor, and FIG. 2B is a bottom view of the charging-discharging capacitor;

FIG. 6A and FIG. 6B are outline views of Example 2 of the charging-discharging capacitor used in the power conversion apparatus illustrated in FIG. 1, wherein FIG. 6A is a perspective view of the charging-discharging capacitor, and FIG. 6B is a bottom view of the charging-discharging capacitor;

FIG. 7A and FIG. 7B are outline views of Example 3 of the charging-discharging capacitor used in the power conversion apparatus illustrated in FIG. 1, wherein FIG. 7A is a perspective view of the charging-discharging capacitor, and FIG. 7B is a bottom view of the charging-discharging capacitor;

FIG. 8A and FIG. 8B are outline views of Example 4 of the charging-discharging capacitor used in the power conversion apparatus illustrated in FIG. 1, wherein FIG. 8A is a perspective view of the charging-discharging capacitor, and FIG. 8B is a bottom view of the charging-discharging capacitor;

FIG. 9A and FIG. 9B are outline views of Example 5 of the charging-discharging capacitor used in the power conversion apparatus illustrated in FIG. 1, wherein FIG. 9A is a perspective view of the charging-discharging capacitor, and FIG. 9B is a bottom view of the charging-discharging capacitor;

FIG. 10A and FIG. 10B are outline views of Example 6 of the charging-discharging capacitor used in the power conversion apparatus illustrated in FIG. 1, wherein FIG. 10A is a perspective view of the charging-discharging capacitor, and FIG. 10B is a bottom view of the charging-discharging capacitor;

FIG. 14A and FIG. 14B are outline views of Example 7 of the charging-discharging capacitor used in the power conversion apparatus illustrated in FIG. 1, wherein FIG. 14A is a perspective view of the charging-discharging capacitor, and FIG. 14B is a bottom view of the charging-discharging capacitor; and FIG. 15A and FIG. 15B are outline views of Example 8 of the charging-discharging capacitor used in the power conversion apparatus illustrated in FIG. 1, wherein FIG. 15A is a perspective view of the charging-discharging capacitor, and FIG. 15B is a bottom view of the charging-discharging capacitor.

DETAILED DESCRIPTION OF THE EMBODIMENTS

A power conversion apparatus according to an embodiment of the present invention will be described below with reference to the attached drawings. As the power conversion apparatus, a DC/DC converter 50 illustrated in FIG. 1 will be mentioned as an example.

Embodiment 1

Figure 1:
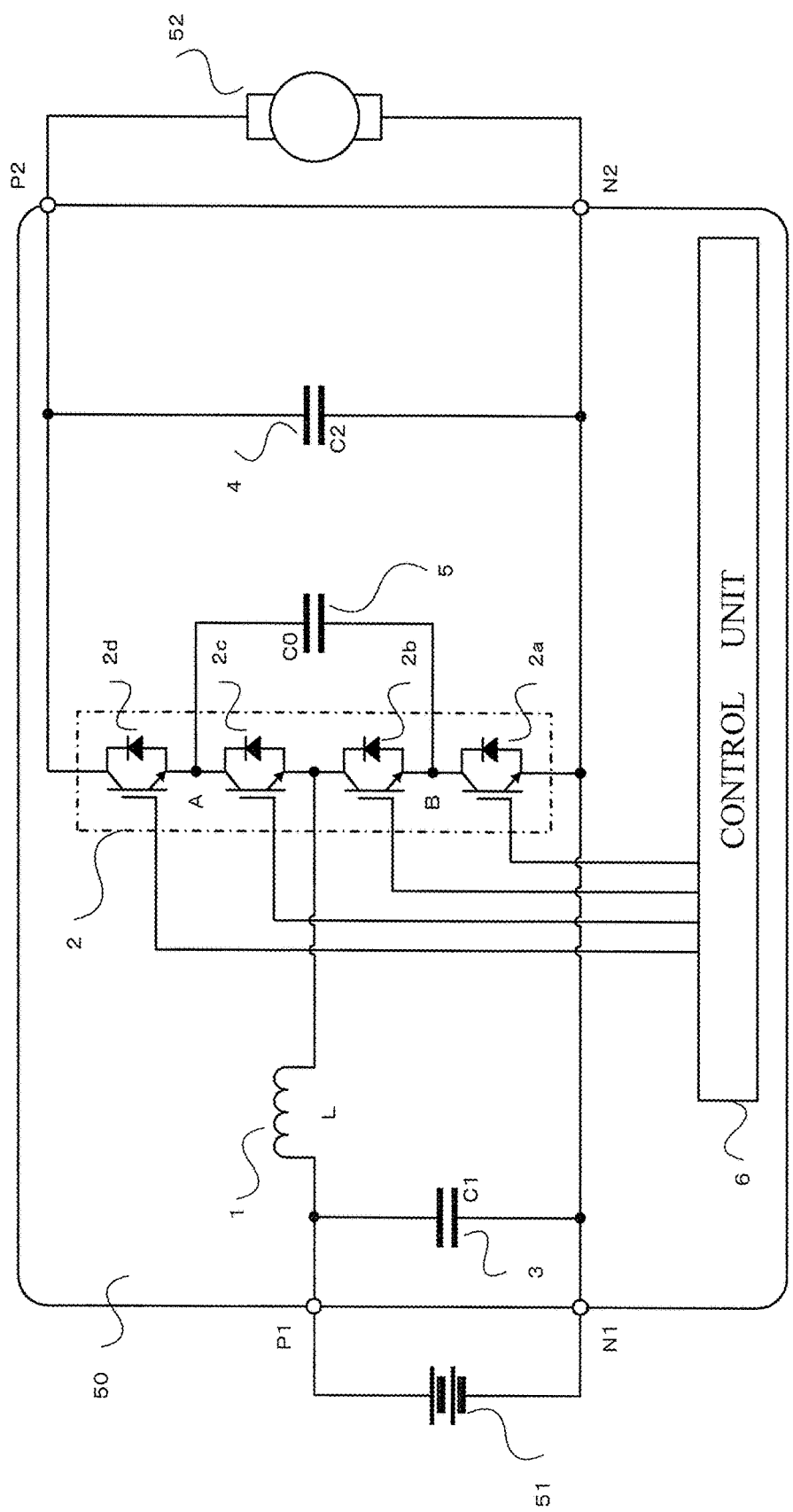
FIG. 1 is a circuit diagram of a power conversion apparatus according to Embodiment 1 of the present invention.

As illustrated in FIG. 1, the power conversion apparatus 50 includes a reactor 1; a semiconductor module 2 having a first semiconductor switching element 2a, a second semiconductor switching element 2b, a third semiconductor switching element 2c, and a fourth semiconductor switching element 2d; a low voltage-side capacitor 3 connected between low voltage-side terminals P1 and N1 of the DC/DC converter 50; a high voltage-side capacitor 4 connected between high voltage-side terminals P2 and N2 of the DC/DC converter 50; a charging-discharging capacitor 5; and a control unit 6 configured to control the first semiconductor switching element 2a, the second semiconductor switching element 2b, the third semiconductor switching element 2c, and the fourth semiconductor switching element 2d.

One end of the first semiconductor switching element 2a is connected to a negative electrode-side terminal of the low voltage-side capacitor 3. One end of the second semiconductor switching element 2b is connected to another end of the first semiconductor switching element 2a, and another end of the second semiconductor switching element 2b is connected to a positive electrode-side terminal of the low voltage-side capacitor 3 via the reactor 1. One end of the third semiconductor switching element 2c is connected to another end of the second semiconductor switching element 2b. One end of the fourth semiconductor switching element 2d is connected to another end of the third semiconductor switching element 2c, and another end of the fourth semiconductor switching element 2d is connected to a positive electrode-side terminal of the high voltage-side capacitor 4.

Further, one end of the charging-discharging capacitor 5 is connected to a junction point B (input side) between the first semiconductor switching element 2a and the second semiconductor switching element 2b, and another end of the charging-discharging capacitor 5 is connected to a junction point A (output side) between the third semiconductor switching element 2c and the fourth semiconductor switching element 2d. Therefore, the charging-discharging capacitor 5 is configured to be inserted in series between a terminal on a low voltage side (input side) and a terminal on a high voltage side (output side). Further, a high voltage battery 51 is connected between the low voltage-side terminals P1 and N1, and an electronic motor 52 is connected between the high voltage-side terminals P2 and N2 of the DC/DC converter 50.

Each of the semiconductor switching elements 2a to 2d includes, for example, an insulated gate bipolar transistor (IGBT) and a diode connected in antiparallel therewith. Further, the charging-discharging capacitor 5 is, for example, a wound type film capacitor.

In FIG. 1, the power conversion apparatus 50 is a bidirectional power conversion apparatus in which bidirectional power conversion is possible between the low voltage-side terminals and the high voltage-side terminals. In this case, an input voltage (low voltage-side voltage) V1 that is input across the low voltage-side terminals P1 and N1 is boosted, and an output voltage (high voltage-side voltage) V2 after the boosting is output across the high voltage-side terminals P2 and N2.

The low voltage-side capacitor 3 smoothes the input voltage V1. The reactor 1 is for the purpose of accumulating energy. Driving the semiconductor module 2 is controlled by the control unit 6 with a switching frequency fsw, and the input voltage V1 is boosted to the output voltage V2 through the switching operation of the semiconductor module 2 and the charging and discharging of the charging-discharging capacitor 5.

In this case, the charging-discharging capacitor 5 charges or discharges energy obtained from the side of the high voltage battery 51 or the side of the electronic motor 52 through driving control of the semiconductor switching elements 2a and 2b under the control of the control unit 6. In this way, the function of converting power from the low voltage-side voltage to the high voltage-side voltage or from the high voltage-side voltage to the low voltage-side voltage is performed. At the same time, the charging-discharging capacitor 5 acts as a noise filter configured to reduce noise passing toward the side of the high voltage battery 51. As described above, the switching of the semiconductor switching elements 2a to 2d is controlled with the frequency fsw.

This operation is described in detail in Japanese Patent No. 5457559 granted to the Applicant of this patent application, and so will be briefly described below.

There are four operation modes of the DC/DC converter in a steady state, i.e., Mode 1 to Mode 4. In Mode 1 in which the semiconductor switching elements 2a and 2c are made ON and the semiconductor switching elements 2b and 2d are made OFF, for example, in power running, the DC/DC converter is in a state of accumulating energy in the charging-discharging capacitor 5; and, for example, in regeneration, the DC/DC converter is in a state of discharging energy of the charging-discharging capacitor 5. In Mode 2 in which the semiconductor switching elements 2a and 2c are made OFF and the semiconductor switching elements 2b and 2d are made ON, in power running, the DC/DC converter is in a state of discharging energy of the charging-discharging capacitor 5; and, in regeneration, the DC/DC converter is in a state of accumulating energy in the charging-discharging capacitor 5.

In Mode 3 in which the semiconductor switching elements 2a and 2b are made OFF and the semiconductor switching elements 2c and 2d are made ON, in power running, the DC/DC converter is in a state of discharging energy of the reactor 1; and, in regeneration, the DC/DC converter is in a state of accumulating energy in the reactor 1. In Mode 4 in which the semiconductor switching elements 2a and 2b are made ON and the semiconductor switching elements 2c and 2d are made OFF, in power running, the DC/DC converter is in a state of accumulating energy in the reactor 1; and, in regeneration, the DC/DC converter is in a state of discharging energy of the reactor 1.

Through appropriate adjustments of time ratios of those operation modes, the input voltage V1 that is the low voltage-side voltage input across the input terminals P1 and N1 can be boosted and can be output across the output terminals P2 and N2 as the output voltage V2.

Examples 1 to 8 of the charging-discharging capacitor 5 will now be described in detail below.

Example 1 of Charging-Discharging Capacitor

Figure 2A:
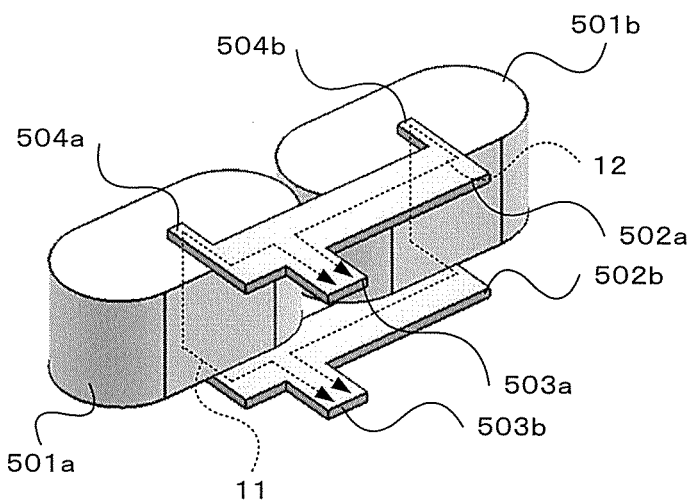
Figure 2B:
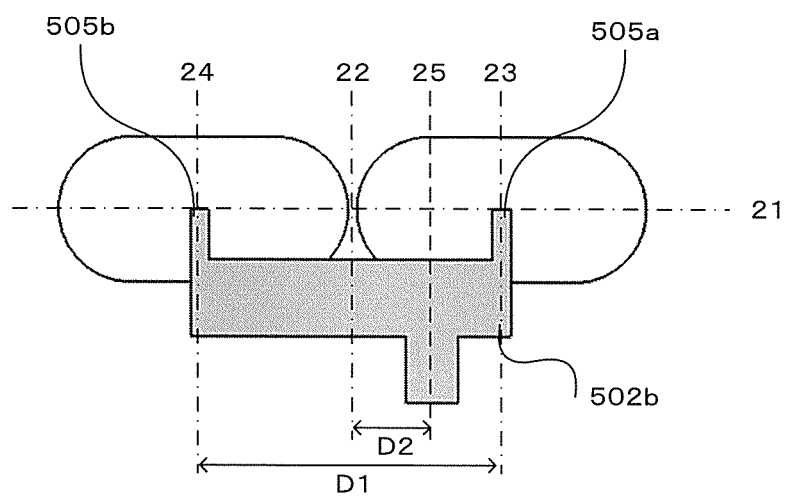

FIG. 2A is an outline perspective view of the charging-discharging capacitor 5 according to Embodiment 1 of the present invention, and FIG. 2B is a bottom view of the charging-discharging capacitor 5. As illustrated in FIG. 2A and FIG. 2B, the charging-discharging capacitor 5 includes a first capacitor element 501a, a second capacitor element 501b, a first wiring 502a, a second wiring 502b, a first outflow-inflow portion 503a, a second outflow-inflow portion 503b, a first electrode portion 504a, a first electrode portion 504b, a second electrode portion 505a, and a second electrode portion 505b.

Further, a center point of the first capacitor element 501a and a center point of the second capacitor element 501b are arranged on a straight line 21 at a distance D1 therebetween, and are connected in parallel between the terminals A and B via the first wiring 502a and the second wiring 502b. Specifically, the first outflow-inflow portion 503a is formed on the first wiring 502a and connected to the junction point A, and the second outflow-inflow portion 503b is formed on the second wiring 502b and connected to the junction point B. Further, the first electrode portion 504a and the first electrode portion 504b are formed in the first wiring 502a, and the second electrode portion 505a and the second electrode portion 505b are formed in the second wiring 502b.

Further, one end of the first capacitor element 501a is connected to the first wiring 502a via the first electrode portion 504a, and another end thereof is connected to the second wiring 502b via the second electrode portion 505a. One end of the second capacitor element 501b is connected to the first wiring 502a via the first electrode portion 504b, and another end thereof is connected to the second wiring 502b via the second electrode portion 505b.

Here, the first capacitor element 501a and the second capacitor element 501b are assumed to have the same film material permittivity, film thickness (distance between internal electrodes), film width (distance between external electrodes), and film wound length, and to have the same capacitance, equivalent series resistance (ESR), and equivalent series inductance (ESL).

Further, the first wiring 502a and the second wiring 502b are assumed to have the same length and cross section, the first outflow-inflow portion 503a and the second outflow-inflow portion 503b are assumed to have the same length and cross section, and the first electrode portion 504a, the first electrode portion 504b, the second electrode portion 505a, and the second electrode portion 505b are assumed to have the same length and cross section.

The first outflow-inflow portion 503a and the second outflow-inflow portion 503b are formed at locations on a straight line (dotted line) 25 at a distance D2 from a straight line (dot-and-dash line) 22 indicating a center of the charging-discharging capacitor 5. Specifically, a loop area of a current path 11 from the junction points A and B corresponding to the first outflow-inflow portion 503a and the second outflow-inflow portion 503b, respectively, to the first capacitor element 501a and a loop area of a current path 12 from the junction points A and B to the second capacitor element 501b are different from each other, the latter loop area being larger than the former.

Therefore, an inductance component at the time when the first capacitor element 501a is viewed from the junction points A and B and an inductance component at the time when the second capacitor element 501b is viewed from the junction points A and B are different from each other, the latter inductance component being larger than the former. The first capacitor element 501a, the second capacitor element 501b, the first wiring 502a, and the second wiring 502b are housed in a case (not shown) formed of a polyphenylene sulfide (PPS) resin or the like. The case is filled with an epoxy resin or the like.

Figure 3:
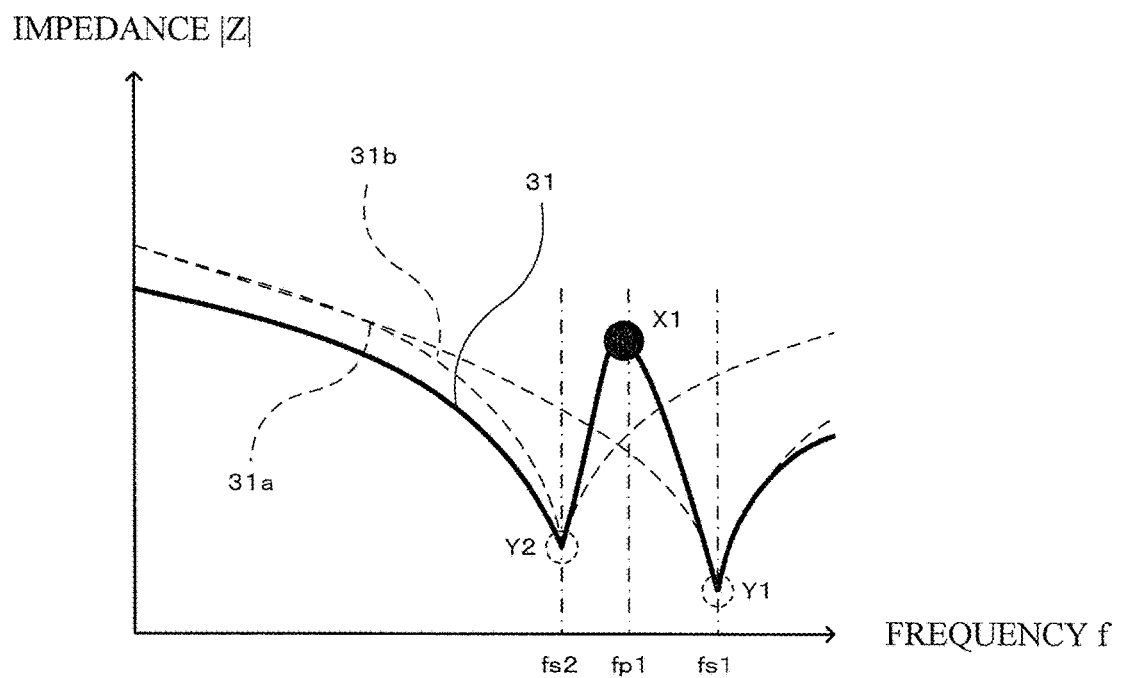
FIG. 3 is a graph for showing frequency characteristics of an absolute value of an impedance of the charging-discharging capacitor illustrated in FIG. 2A and FIG. 2B.

FIG. 3 is a graph for showing frequency characteristics of an absolute value |Z| of an impedance Z of the charging-discharging capacitor 5 according to Embodiment 1 of the present invention. In this case, there are shown an impedance 31a on the side of the first capacitor element 501a, an impedance 31b on the side of the second capacitor element 501b, and an impedance 31 of the charging-discharging capacitor 5 that is a parallel circuit of the first capacitor element 501a and the second capacitor element 501b. As shown in FIG. 3, the impedance 31a has a series resonance point Y1 at a series resonance frequency fs1, the impedance 31b has a series resonance point Y2 at a series resonance frequency fs2, and the impedance 31 has a parallel resonance point X1 at a parallel resonance frequency fp1.

The series resonance frequency fs1 is expressed by Expression (1) below using an inductance component L1 and a capacitance component C1 of the current path 11 to the first capacitor element 501a.

$$fs1=1/\{2\pi(L1 \cdot C1)^{1/2}\} \qquad \text{Expression (1)}$$

Further, the series resonance frequency fs2 is expressed by Expression (2) below using an inductance component L2 and a capacitance component C2 of the current path 12 to the second capacitor element 501b. It is to be noted that characteristics of the first capacitor element 501a and of the second capacitor element 501b are the same, so that C1=C2 is found.

$$fs2=1/\{2\pi(L2 \cdot C2)^{1/2}\} \qquad \text{Expression (2)}$$

As described above, the relationship of L1<L2 holds, and thus, fs1>fs2. In a frequency band between the series resonance frequencies fs2 and fs1, the first capacitor element 501a acts as a capacitor and the second capacitor element 501b acts as an inductor. Thus, a parallel resonance of the first capacitor element 501a and the second capacitor element 501b occurs. As a result, the impedance 31 of the charging-discharging capacitor 5 is increased. Specifically, as shown in FIG. 3, the impedance 31 of the charging-discharging capacitor 5 takes a maximum value at the parallel resonance point X1 at the time when the frequency is the parallel resonance frequency fp1 (fs2<fp1<fs1).

Figure 4:
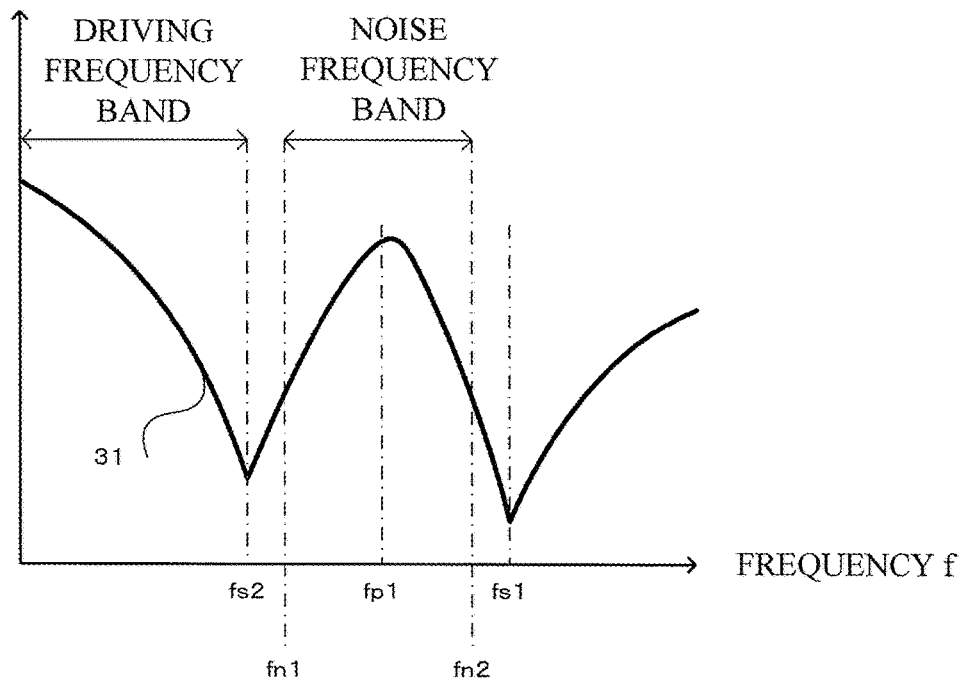
FIG. 4 is a graph for showing a relationship between the absolute value of the impedance of the charging-discharging capacitor illustrated in FIG. 2A and FIG. 2B and respective frequency bands.

FIG. 4 is a graph for showing a relationship between the absolute value of the impedance 31 of the charging-discharging capacitor 5 according to Example 1 and the respective frequency bands, where assuming that N is a positive number and the driving frequency band is fsw to fsw×N, the first capacitor element 501a is designed so as to satisfy fs1>fsw×N, and the second capacitor element 501b is designed so as to satisfy fs2>fsw×N.

Assuming that a noise frequency band required to be attenuated is fn1 to fn2 (fn1<fn2), the first capacitor element 501a is designed so as to satisfy fs1>fn2, and the second capacitor element 501b is designed so as to satisfy fs2<fn1.

Therefore, the charging-discharging capacitor 5 does not have a parallel resonance point in the driving frequency band but has a parallel resonance point in the noise frequency band. It is to be noted that dimensions of the wirings, the outflow-inflow portions, and the electrode portions are appropriately adjusted depending on the driving frequency band and the noise frequency band. With N having a small value, a relatively low frequency band in the vicinity of the driving frequency can be covered as a noise frequency band.

Figure 5:
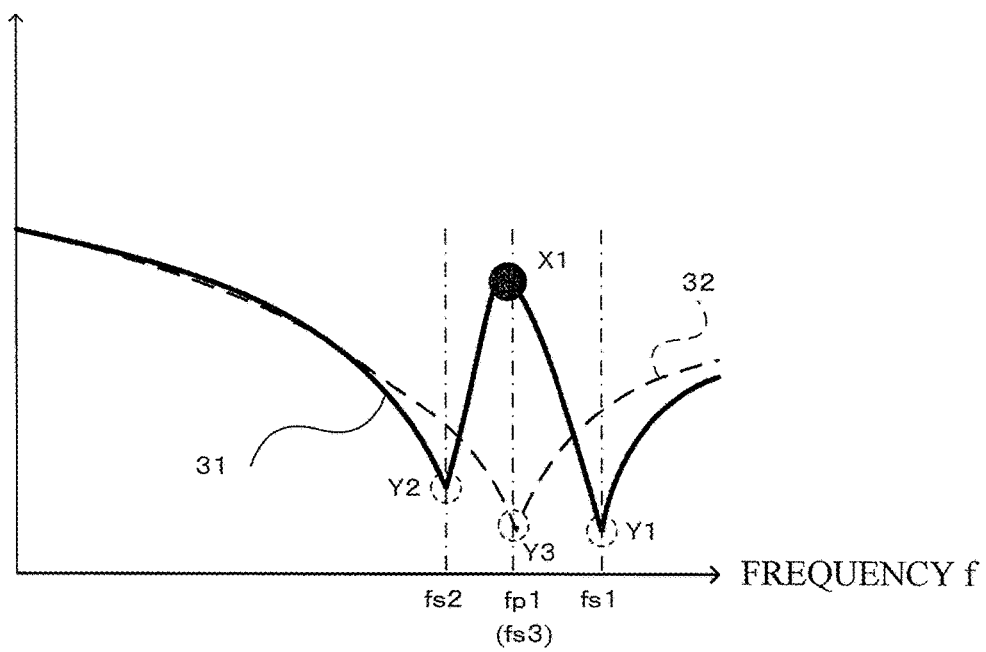
FIG. 5 is a graph for showing a difference in frequency characteristics of the absolute value of the impedance in the presence of a parallel resonance point of the charging-discharging capacitor illustrated in FIG. 2A and FIG. 2B and in the absence of the parallel resonance point of the charging-discharging capacitor illustrated in FIG. 2A and FIG. 2B.

FIG. 5 is a graph for showing a difference in frequency characteristics of the absolute values of the impedances in the presence of a parallel resonance point of the charging-discharging capacitor according to Embodiment 1 of the present invention and in the absence of the parallel resonance point of the charging-discharging capacitor. Here, there are shown the impedance 31 (solid line) of the charging-discharging capacitor 5 in the presence of the parallel resonance point due to displaced locations of the outflow-inflow portions (the present invention) and an impedance 32 (dotted line) of the charging-discharging capacitor 5 in the absence of the parallel resonance point due to non-displaced locations of the outflow-inflow portions (distance D2 is zero).

As shown in FIG. 5, the impedance 32 has a series resonance point Y3 at a series resonance frequency fs3. Compared with the impedance 32, the impedance 31 is larger in the vicinity of the parallel resonance point X1. Therefore, compared with the impedance 32, the impedance 31 can attenuate more noise in the noise frequency band in the vicinity of the parallel resonance point.

While as an example, both the first outflow-inflow portion 503a and the second outflow-inflow portion 503b are arranged so as to be displaced from the straight line 22 by the distance D2, only any one of the first outflow-inflow portion 503a and the second outflow-inflow portion 503b may be arranged so as to be displaced from the straight line 22 by the distance D2. Specifically, insofar as the inductance component at the time when the first capacitor element 501a is viewed from the junction points A and B and the inductance component at the time when the second capacitor element 501b is viewed from the junction points A and B are different from each other, the first outflow-inflow portion 503a and the second outflow-inflow portion 503b may be arranged arbitrarily within the manufacturing restraints of the capacitor.

Thus, in the power conversion apparatus including the plurality of semiconductor switching elements, the reactor, the charging-discharging capacitor, and the control unit configured to insert the charging-discharging capacitor in series between the input and the output thereof through driving control of the plurality of semiconductor switching elements at a predetermined driving frequency, the charging-discharging capacitor is formed by connecting the first capacitor element in parallel with the second capacitor element. Further, the charging-discharging capacitor includes the first wiring, the second wiring, the first outflow-inflow portion, the second outflow-inflow portion, the plurality of first electrode portions, and the plurality of second electrode portions. The first outflow-inflow portion is formed in the first wiring and is connected to the output side. The second outflow-inflow portion is formed in the second wiring and is connected to the input side. The one end of the first capacitor element and the one end of the second capacitor element are connected to the first wiring via the first electrode portions, respectively, and the another end of the first capacitor element and the another end of the second capacitor element are connected to the second wiring via the second electrode portions, respectively. The outflow-inflow portions of the charging-discharging capacitor are arranged so as to be displaced from the center of the capacitor elements.

This makes the loop areas of the current paths to the respective capacitor elements are different from each other, and makes the inductance components at the time when the capacitor elements are viewed from the outflow-inflow portions are different from each other. Therefore, the charging-discharging capacitor does not have a parallel resonance point in the driving frequency band but has a parallel resonance point in the noise frequency band, and the impedance becomes larger in the vicinity of the parallel resonance point. Therefore, noise in a desired frequency band including a relatively low frequency band in the vicinity of the driving frequency of the semiconductor switching elements can be reduced without the addition of a noise filter outside the apparatus.

Example 2 of Charging-Discharging Capacitor

Figure 6A:
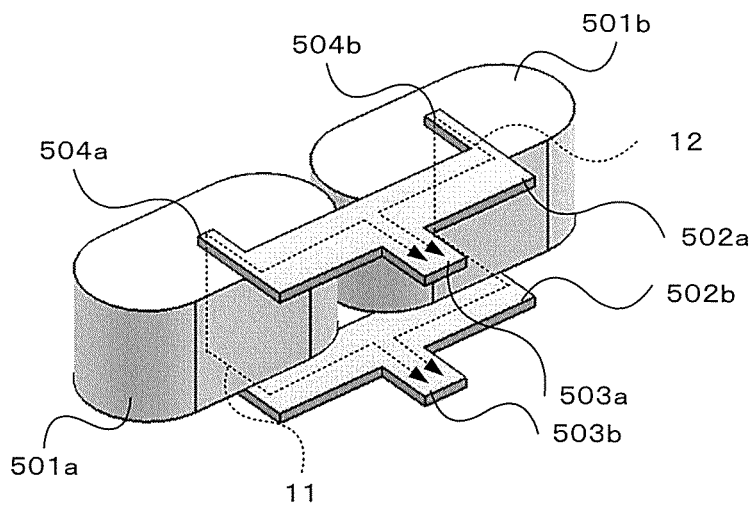
Figure 6B:
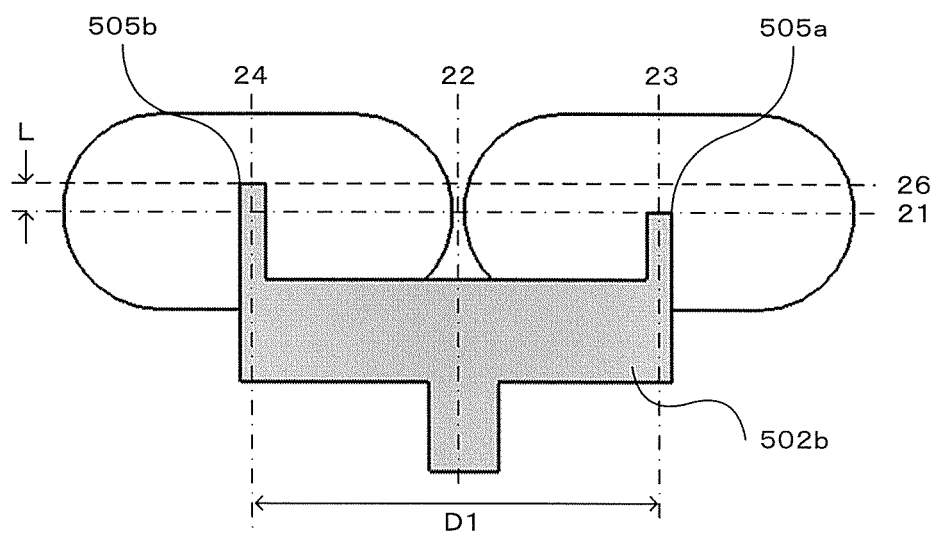

FIG. 6A is a perspective view of Example 2 of the charging-discharging capacitor used in the power conversion apparatus of the present invention and FIG. 6B is a bottom view of the charging-discharging capacitor.

The charging-discharging capacitor 5 illustrated in FIG. 6A and FIG. 6B is different from the charging-discharging capacitor 5 illustrated in FIG. 2A and FIG. 2B in that the first outflow-inflow portion 503a and the second outflow-inflow portion 503b are formed on the straight line 22 indicating the center of the charging-discharging capacitor 5, and in that the first electrode portion 504b and the second electrode portion 505b are longer than the first electrode portion 504a and the second electrode portion 505a, respectively, by a distance L. In other words, those electrode portions have mutually different lengths.

Therefore, the loop area of the current path 11 from the junction points A and B to the first capacitor element 501a and the loop area of the current path 12 from the junction points A and B to the second capacitor element 501b illustrated in FIG. 6A are different from each other, the latter loop area being larger than the former. In other words, the inductance component at the time when the first capacitor element 501a is viewed from the junction points A and B and the inductance component at the time when the second capacitor element 501b is viewed from the junction points A and B are different from each other, the latter inductance component being larger than the former. Except for the locations of the outflow-inflow portions and the lengths of the electrode portions of the charging-discharging capacitor 5, this Example 2 is similar to Example 1 illustrated in FIG. 2A and FIG. 2B, and thus, the description of the structure and the operation of the entire apparatus will be hereafter omitted.

As described above, the first outflow-inflow portion 503a and the second outflow-inflow portion 503b are formed on the straight line 22 indicating the center of the charging-discharging capacitor 5, and the first electrode portion 504b and the second electrode portion 505b are longer than the first electrode portion 504a and the second electrode portion 505a, respectively, by the distance L. Therefore, the inductance component L2 of the current path 12 to the second capacitor element 501b is larger than the inductance component L1 of the current path 11 to the first capacitor element 501a.

Therefore, similarly to Example 1, the absolute value of the impedance of the charging-discharging capacitor 5 has characteristics similar to those of the impedance 31 shown in FIG. 5, i.e., has the series resonance point Y1 at the series resonance frequency fs1 on the side of the first capacitor element 501a, has the series resonance point Y2 at the series resonance frequency fs2 on the side of the second capacitor element 501b, and has the parallel resonance point X1 at the parallel resonance frequency fp1 between fs2 and fs1.

Meanwhile, the impedance in the case where all the electrode portions have the same length can be thought to have characteristics similar to those of the impedance 32 shown in FIG. 5. Therefore, it can be found that at the time when the electrode portions have different lengths, more noise in the noise frequency band can be attenuated in the vicinity of the parallel resonance point.

While in this case, as an example, the first electrode portion 504b and the second electrode portion 505b are longer than the first electrode portion 504a and the second electrode portion 505a, respectively, by the distance L, only the first electrode portion 504b may have a larger length. Specifically, insofar as the inductance component at the time when the first capacitor element 501a is viewed from the junction points A and B and the inductance component at the time when the second capacitor element 501b is viewed from the junction points A and B are different from each other, the first electrode portion 504a, the first electrode portion 504b, the second electrode portion 505a, and the second electrode portion 505b may have any length within the manufactural restraints of the capacitor.

In this way, by adjusting at least one of the plurality of first electrode portions and the plurality of second electrode portions to have a different length, the loop areas of the current paths to the respective capacitor elements are different from each other, and the inductance components at the time when the capacitor elements are viewed from the outflow-inflow portions are different from each other. Therefore, the charging-discharging capacitor does not have a parallel resonance point in the driving frequency band but has a parallel resonance point in the noise frequency band, and the impedance becomes larger in the vicinity of the parallel resonance point. Therefore, noise in a desired frequency band including a relatively low frequency band in the vicinity of the driving frequency of the semiconductor switching elements can be reduced without the addition of a noise filter outside the apparatus.

Example 3 of Charging-Discharging Capacitor

Figure 7A:
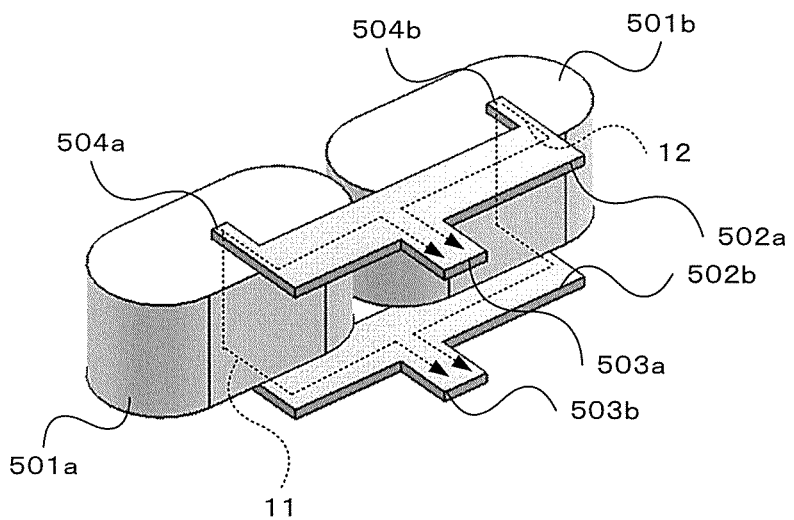
Figure 7B:
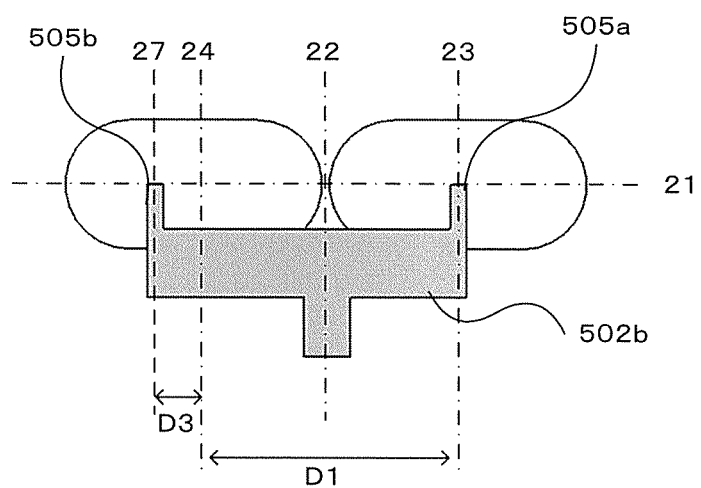

FIG. 7A is a perspective view of Example 3 of the charging-discharging capacitor used in the power conversion apparatus of the present invention and FIG. 7B is a bottom view of the charging-discharging capacitor.

The charging-discharging capacitor 5 illustrated in FIG. 7A and FIG. 7B is different from the charging-discharging capacitor 5 illustrated in FIG. 2A and FIG. 2B in that the first outflow-inflow portion 503a and the second outflow-inflow portion 503b are formed on the straight line 22 indicating the center of the charging-discharging capacitor 5, and in that the first electrode portion 504a and the second electrode portion 505a are formed on a straight line 23 indicating a center of the first capacitor element 501a, but the first electrode portion 504b and the second electrode portion 505b are formed at locations that are displaced from a straight line 24 indicating a center of the second capacitor element 501b by a distance D3.

Therefore, the loop area of the current path 11 from the junction points A and B to the first capacitor element 501a and the loop area of the current path 12 from the junction points A and B to the second capacitor element 501b illustrated in FIG. 7A are different from each other, the latter loop area being larger than the former. Therefore, the inductance component at the time when the first capacitor element 501a is viewed from the junction points A and B and the inductance component at the time when the second capacitor element 501b is viewed from the junction points A and B are different from each other, the latter inductance component being larger than the former.

Except for the locations of the outflow-inflow portions and the electrode portions of the charging-discharging capacitor 5, this Example 3 is similar to Example 1 of the charging-discharging capacitor 5 illustrated in FIG. 1, and thus, the description of the structure and the operation of the entire apparatus will be hereafter omitted.

As described above, the first outflow-inflow portion 503a and the second outflow-inflow portion 503b are formed on the straight line 22 indicating the center of the charging-discharging capacitor 5, the first electrode portion 504a and the second electrode portion 505a are formed on the straight line 23 indicating the center of the first capacitor element 501a, and the first electrode portion 504b and the second electrode portion 505b are formed at the locations that are displaced from the straight line 24 indicating the center of the second capacitor element 501b by the distance D3. Thus, the inductance component L2 of the current path 12 to the second capacitor element 501b is larger than the inductance component L1 of the current path 11 to the first capacitor element 501a.

Therefore, similarly to Example 1 of the charging-discharging capacitor 5, the absolute value of the impedance of the charging-discharging capacitor 5 has characteristics similar to those of the impedance 31 shown in FIG. 5, i.e., has the series resonance point Y1 at the series resonance frequency fs1 on the side of the first capacitor element 501a, has the series resonance point Y2 at the series resonance frequency fs2 on the side of the second capacitor element 501b, and has the parallel resonance point X1 at the parallel resonance frequency fp1 between fs2 and fs1.

Meanwhile, the impedance at the time when all the electrode portions are formed at the respective centers of the capacitor elements can be thought to have characteristics similar to those of the impedance 32 shown in FIG. 5. Therefore, it can be found that when the electrode portions are arranged so as to be displaced from the center of the capacitor element, more noise in the noise frequency band can be attenuated in the vicinity of the parallel resonance point.

In this case, as an example, the first electrode portion 504a and the second electrode portion 505a are formed on the straight line 23 indicating the center of the first capacitor element 501a, and the first electrode portion 504b and the second electrode portion 505b are formed at the locations that are displaced from the straight line 24 indicating the center of the second capacitor element 501b by the distance D3. However, the first electrode portion 504a and the second electrode portion 505a may be formed on the straight line 23, the first electrode portion 504b may be formed on the straight line 24, and the second electrode portion 505b may be formed at the location that is displaced from the straight line 24 by the distance D3.

Specifically, insofar as the inductance component at the time when the first capacitor element 501a is viewed from the junction points A and B and the inductance component at the time when the second capacitor element 501b is viewed from the junction points A and B are different from each other, the distances from the straight line 23 to the first electrode portion 504a and the second electrode portion 505a, respectively, and the distances from the straight line 24 to the first electrode portion 504b and the second electrode portion 505b, respectively, may be any lengths within the manufactural restraints of the capacitor.

In this way, by arranging at least one of the plurality of first electrode portions and the plurality of second electrode portions so as to be displaced from the center of the capacitor element, the loop areas of the current paths to the respective capacitor elements are made different from each other. Then, the inductance components at the time when the capacitor elements are viewed from the outflow-inflow portions are different from each other. As a result, the charging-discharging capacitor does not have a parallel resonance point in the driving frequency band but has a parallel resonance point in the noise frequency band, and the impedance becomes larger in the vicinity of the parallel resonance point. Therefore, noise in a desired frequency band including a relatively low frequency band in the vicinity of the driving frequency of the semiconductor switching elements can be reduced without the addition of a noise filter outside the apparatus.

Example 4 of Charging-Discharging Capacitor

Figure 8A:
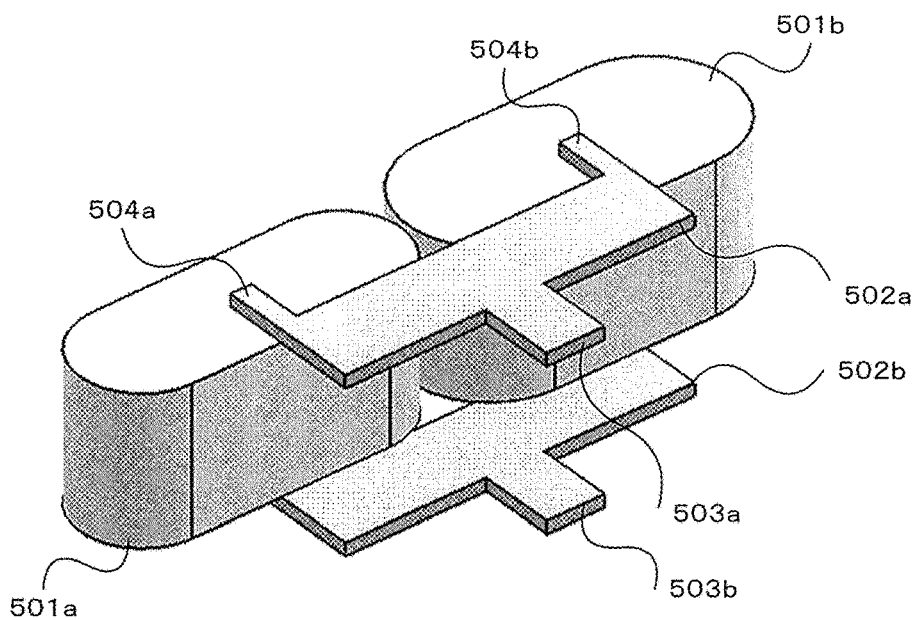
Figure 8B:
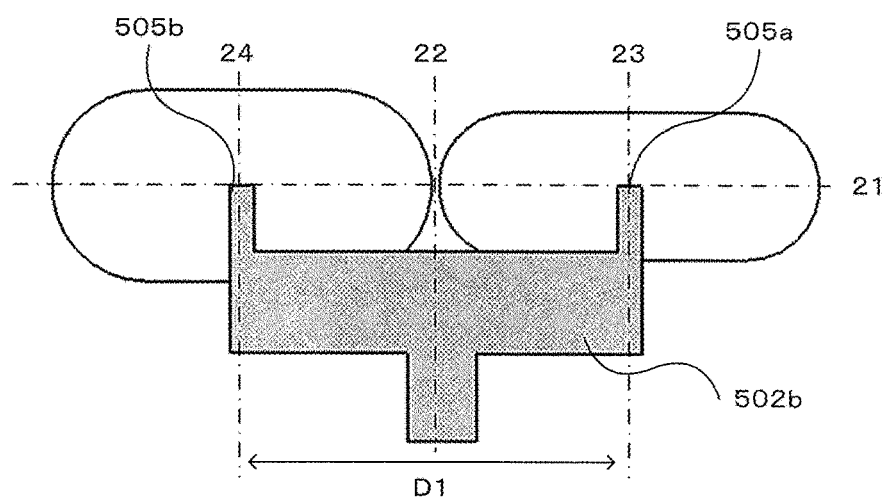

FIG. 8A is a perspective view of Example 4 of the charging-discharging capacitor used in the power conversion apparatus of the present invention and FIG. 8B is a bottom view of the charging-discharging capacitor.

The charging-discharging capacitor 5 illustrated in FIG. 8A and FIG. 8B is different from the charging-discharging capacitor 5 of Example 1 illustrated in FIG. 2A and FIG. 2B in that the first outflow-inflow portion 503a and the second outflow-inflow portion 503b are formed on the straight line 22 indicating the center of the charging-discharging capacitor 5, and in that a capacitance of the first capacitor element 501a and a capacitance of the second capacitor element 501b are different from each other. In this case, by adjusting a wound length of a film material of the latter to be larger than that of the former, the capacitances of the capacitor elements are made different from each other.

Therefore, the capacitance component at the time when the first capacitor element 501a is viewed from the junction points A and B and the capacitance component at the time when the second capacitor element 501b is viewed from the junction points A and B are different from each other, the latter capacitance component being larger than the former. Except for the locations of the outflow-inflow portions and the capacitances of the capacitor elements of the charging-discharging capacitor 5, this Example 4 is similar to Example 1 illustrated in FIG. 2A and FIG. 2B, and thus, the description of the structure and the operation of the entire apparatus will be hereafter omitted.

As described above, the first outflow-inflow portion 503a and the second outflow-inflow portion 503b are formed on the straight line 22 indicating the center of the charging-discharging capacitor 5, and the capacitance of the second capacitor element 501b is larger than the capacitance of the first capacitor element 501a. Therefore, similarly to Example 1, the absolute value of the impedance of the charging-discharging capacitor 5 has characteristics similar to those of the impedance 31 shown in FIG. 5, i.e., has the series resonance point Y1 at the series resonance frequency fs1 on the side of the first capacitor element 501a, has the series resonance point Y2 at the series resonance frequency fs2 on the side of the second capacitor element 501b, and has the parallel resonance point X1 at the parallel resonance frequency fp1 between fs2 and fs1.

Meanwhile, the impedance in the case where the capacitances of the capacitor elements are the same can be thought to have characteristics similar to those of the impedance 32 shown in FIG. 5. Therefore, when the capacitances of the capacitor elements are different from each other, more noise in the noise frequency band can be attenuated in the vicinity of the parallel resonance point.

In this case, as an example, the capacitances of the capacitor elements are made different from each other by adjusting the wound lengths of the films to differ from each other. However, the film widths (distances between external electrodes), the film material permittivities, the film thicknesses (distances between internal electrodes), or the like may differ from each other.

In this way, by adjusting the wound lengths of the two capacitor elements to differ from each other, the capacitance components at the time when the capacitor elements are viewed from the outflow-inflow portions are different from each other. Thus, the charging-discharging capacitor does not have a parallel resonance point in the driving frequency band but has a parallel resonance point in the noise frequency band. Therefore, the impedance becomes larger in the vicinity of the parallel resonance point. Therefore, noise in a desired frequency band including a relatively low frequency band in the vicinity of the driving frequency of the semiconductor switching elements can be reduced without the addition of a noise filter outside the apparatus.

Example 5 of Charging-Discharging Capacitor

Figure 9A:
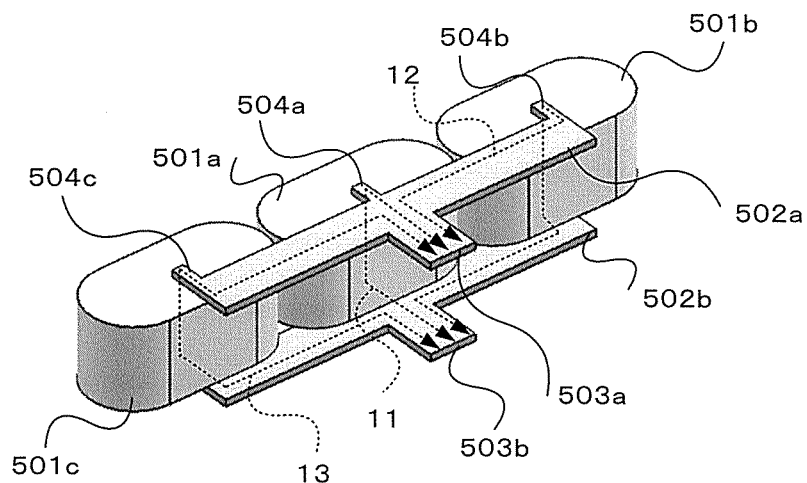
Figure 9B:
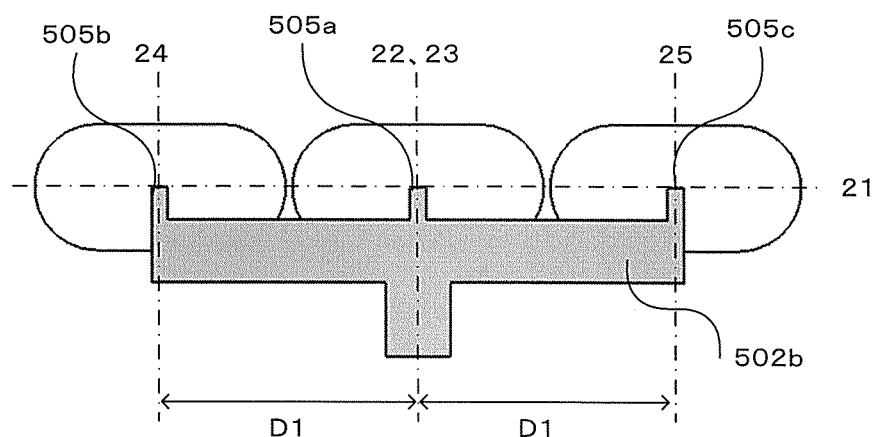

FIG. 9A is a perspective view of Example 5 of the charging-discharging capacitor used in the power conversion apparatus of the present invention and FIG. 9B is a bottom view of the charging-discharging capacitor.

The charging-discharging capacitor 5 illustrated in FIG. 9A and FIG. 9B is different from the charging-discharging capacitor 5 of Example 1 illustrated in FIG. 2A and FIG. 2B in the following: A third capacitor element 501c having characteristics similar to those of other capacitor elements is added outside the first capacitor element 501a, the third capacitor element 501c and the other capacitor elements 501a and 501b are arranged on the straight line 21 with the same distance D1 therebetween, a first electrode portion 504c and a second electrode portion 505c are added, and the first outflow-inflow portion 503a and the second outflow-inflow portion 503b are formed on the straight line 22 indicating the center of the charging-discharging capacitor 5.

In this case, the straight line 23 indicates the center of the first capacitor element 501a, the straight line 24 indicates the center of the second capacitor element 501b, and a straight line 25 indicates a center of the third capacitor element 501c. The first electrode portion 504a and the second electrode portion 505a are arranged on the straight line 23, the first electrode portion 504b and the second electrode portion 505b are arranged on the straight line 24, and the first electrode portion 504c and the second electrode portion 505c are arranged on the straight line 25. Further, all of the electrode portions have the same length.

Therefore, the loop area of the current path 12 from the junction points A and B to the second capacitor element 501b and the loop area of a current path 13 from the junction points A and B to the third capacitor element 501c illustrated in FIG. 9A are the same. Meanwhile, the loop area of the current path 11 from the junction points A and B to the first capacitor element 501a is smaller than and differs from the loop areas in the cases of the other two capacitor elements 501b and 501c.

In other words, the inductance component at the time when the second capacitor element 501b is viewed from the junction points A and B and the inductance component at the time when the third capacitor element 501c is viewed from the junction points A and B are the same. Meanwhile, the inductance component at the time when the first capacitor element 501a is viewed from the junction points A and B is different from (is smaller than) the inductance components in the cases of the other two capacitor elements 501b and 501c.

Except for the locations of the outflow-inflow portions and the numbers of the capacitor elements and the electrode portions of the charging-discharging capacitor 5, this Example 5 is similar to Example 1 illustrated in FIG. 2A and FIG. 2B, and thus, the description of the structure and the operation of the entire apparatus will be hereafter omitted.

Similarly to Example 1, the series resonance frequency fs1 of the current path 11 to the first capacitor element 501a is expressed by Expression (1) above, and the series resonance frequency fs2 of the current path 12 to the second capacitor element 501b is expressed by Expression (2) above. Further, the inductance component of the current path 12 and the inductance component of the current path 13 are the same, so that it can be found that a series resonance frequency of the current path 13 to the third capacitor element 501c is expressed by Expression (2) above.

Therefore, similarly to the case of Example 1, the absolute value of the impedance of the charging-discharging capacitor 5 has characteristics similar to those of the impedance 31 shown in FIG. 5, i.e., has the series resonance point Y1 at the series resonance frequency fs1 on the side of the first capacitor element 501a, has the series resonance point Y2 at the series resonance frequency fs2 on the side of the second capacitor element 501b as well as on the side of the third capacitor element 501c, and has the parallel resonance point X1 at the parallel resonance frequency fp1 between fs2 and fs1. Specifically, more noise in the noise frequency band can be attenuated in the vicinity of the parallel resonance point.

By connecting the three capacitor elements in parallel and arranging the outflow-inflow portions at the center of the charging-discharging capacitor, the loop area of the current path to the first capacitor element is different from the loop areas of the current paths to the other two capacitor elements. Thus, the inductance component at the time when the first capacitor element is viewed from the outflow-inflow portions is different from the inductance components at the time when the other two capacitor elements are viewed from the outflow-inflow portions.

Therefore, the charging-discharging capacitor 5 does not have a parallel resonance point in the driving frequency band and has a parallel resonance point in the noise frequency band, and the impedance becomes larger in the vicinity of the parallel resonance point. Therefore, noise in a desired frequency band including a relatively low frequency band in the vicinity of the driving frequency of the semiconductor switching elements can be reduced without the addition of a noise filter outside the apparatus.

Example 6 of Charging-Discharging Capacitor

Figure 10A:
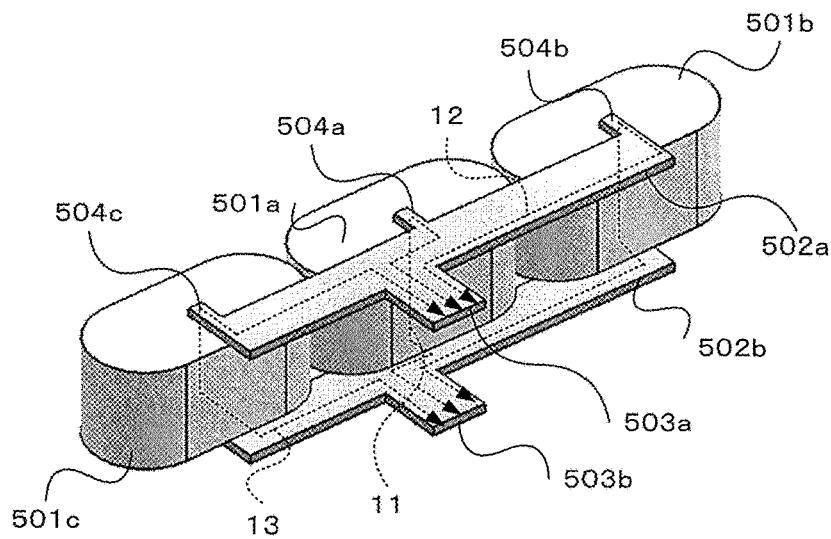
Figure 10B:
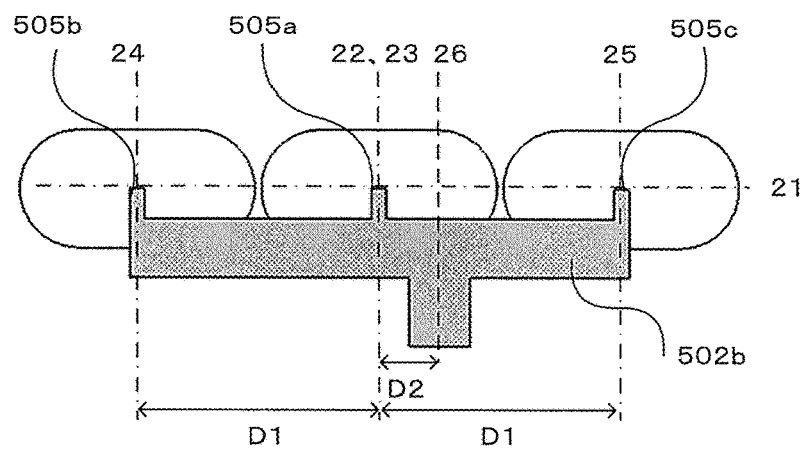

FIG. 10A is a perspective view of Example 6 of the charging-discharging capacitor used in the power conversion apparatus of the present invention and FIG. 10B is a bottom view of the charging-discharging capacitor.

The charging-discharging capacitor 5 illustrated in FIG. 10A and FIG. 10B is different from the charging-discharging capacitor 5 of Example 5 illustrated in FIG. 9A and FIG. 9B in that the first outflow-inflow portion 503a and the second outflow-inflow portion 503b are formed on a straight line 26 that is displaced, by the distance D2, from the straight line 22 indicating the center of the charging-discharging capacitor 5.

Therefore, the loop area of the current path 11 from the junction points A and B to the first capacitor element 501a, the loop area of the current path 12 from the junction points A and B to the second capacitor element 501b, and the loop area of the current path 13 from the junction points A and B to the third capacitor element 501c illustrated in FIG. 10A are different from one another. Further, the loop areas become larger in the order of 11→13→12.

Therefore, the inductance components become larger in the order of the inductance component at the time when the first capacitor element 501a is viewed from the junction points A and B, the inductance component at the time when the third capacitor element 501c is viewed from the junction points A and B, and the inductance component at the time when the second capacitor element 501b is viewed from the junction points A and B. Except for the structure of the charging-discharging capacitor 5, this Example 6 is similar to Example 1 illustrated in FIG. 2A and FIG. 2B, and thus, the description of the structure and the operation of the entire apparatus will be hereafter omitted.

Figure 11:
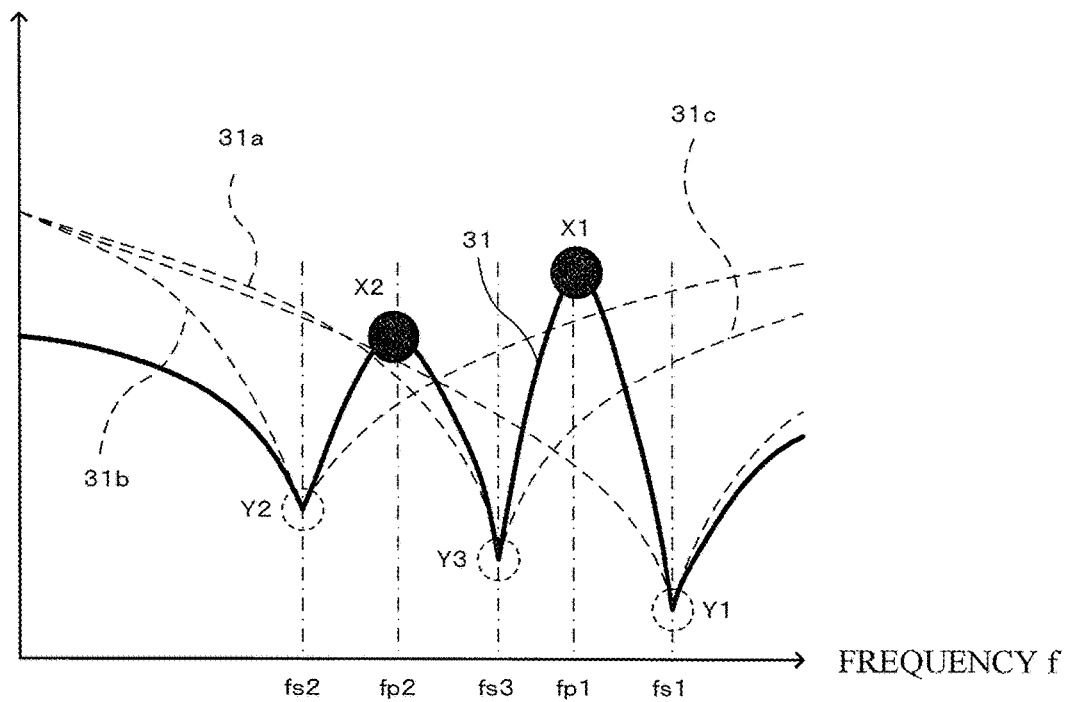
FIG. 11 is a graph for showing frequency characteristics of an absolute value of an impedance of the charging-discharging capacitor illustrated in FIG. 10A and FIG. 10B.

FIG. 11 is a graph for showing frequency characteristics of the absolute value |Z| of the impedance Z of the charging-discharging capacitor 5 according to this Example 6. In this case, there are shown the impedance 31a on the side of the first capacitor element 501a, the impedance 31b on the side of the second capacitor element 501b, an impedance 31c on the side of the third capacitor element 501c, and the impedance 31 of the charging-discharging capacitor 5. As shown in FIG. 11, the impedance 31a has the series resonance point Y1 at the series resonance frequency fs1, the impedance 31b has the series resonance point Y2 at the series resonance frequency fs2, and the impedance 31c has the series resonance point Y3 at the series resonance frequency fs3. Further, the impedance 31 has the three series resonance points described above, the parallel resonance point X1 at the parallel resonance frequency fp1, and a parallel resonance point X2 at a parallel resonance frequency fp2, respectively.

Similarly to Example 1, the series resonance frequency fs1 of the current path 11 to the first capacitor element 501a is expressed by Expression (1) above, and the series resonance frequency fs2 of the current path 12 to the second capacitor element 501b is expressed by Expression (2) above. Further, the series resonance frequency fs3 is expressed by Expression (3) below using an inductance component L3 and a capacitance component C3 of the current path 13 to the third capacitor element 501c, where the characteristics of the capacitor elements are the same, so that C1=C2=C3 is found.

$$fs3=1/\{2\pi(L3C3)^{1/2}\}$$ Expression (3)

As described above, a relationship of L1<L3<L2 holds for the inductance component, and thus, fs2<fs3<fs1 is found. In a frequency band between fs2 and fs3, the first capacitor element 501a and the third capacitor element 501c act as a capacitor and the second capacitor element 501b acts as an inductor, and thus, parallel resonance occurs between the capacitor elements. As a result, the impedance 31 of the charging-discharging capacitor 5 is increased. As shown in FIG. 11, the impedance 31 of the charging-discharging capacitor 5 takes a maximum value at the parallel resonance point X2 when the frequency is the parallel resonance frequency fp2 (fs2<fp2<fs3).

Further, in a frequency band between fs3 and fs1, the second capacitor element 501b and the third capacitor element 501c act as an inductor and the first capacitor element 501a acts as a capacitor, and thus, parallel resonance occurs between the capacitor elements. As a result, the impedance of the charging-discharging capacitor 5 is increased. As shown in FIG. 11, the impedance 31 of the charging-discharging capacitor 5 takes a maximum value at the parallel resonance point X1 when the frequency is the parallel resonance frequency fp1 (fs3<fp1<fs1).

Figure 12:
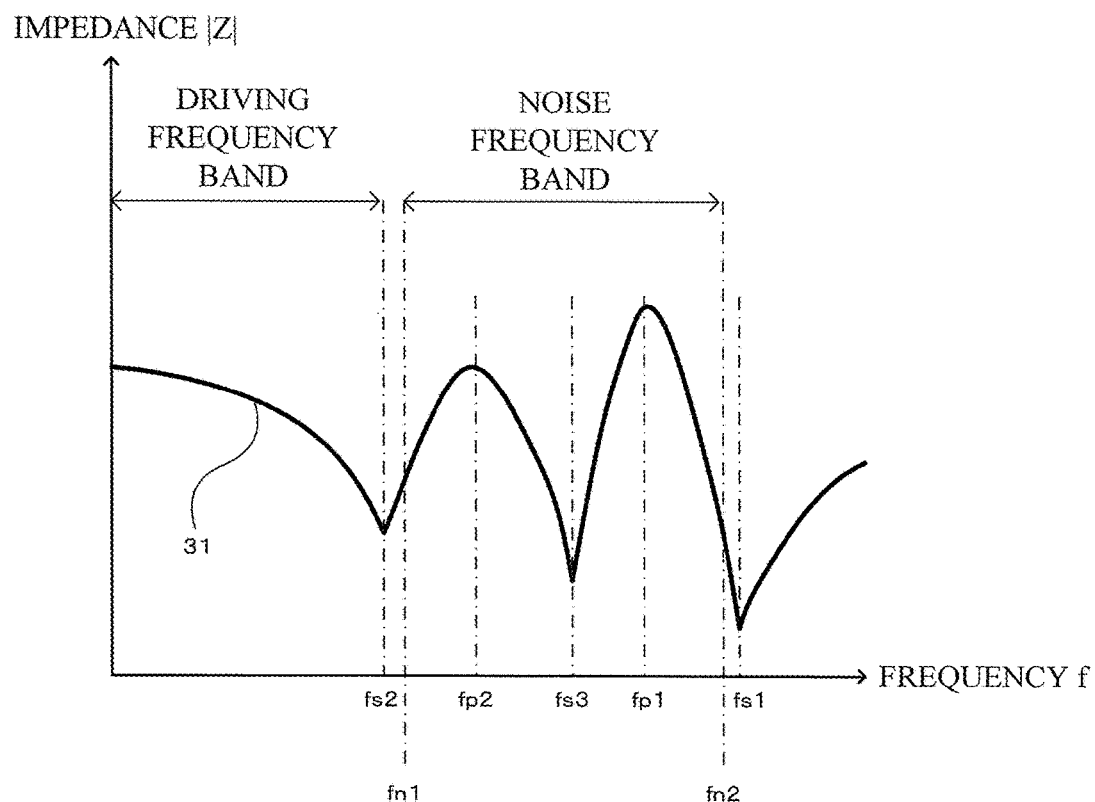
FIG. 12 is a graph for showing a relationship between the absolute value of the impedance of the charging-discharging capacitor illustrated in FIG. 10A and FIG. 10B and respective frequency bands.

FIG. 12 is a graph for showing a relationship between the absolute value 121 of the impedance 2 of the charging-discharging capacitor according to Example 6 and the respective frequency bands. Assuming that N is a positive number and the driving frequency band is fsw to fsw×N, the first capacitor element 501a is designed so as to satisfy fs1>fsw×N, the second capacitor element 501b is designed so as to satisfy fs2>fsw×N, and the third capacitor element 501c is designed so as to satisfy fs3>fsw×N.

Assuming that the noise frequency band required to be attenuated is fn1 to fn2 (fn1<fn2), the first capacitor element 501a is designed so as to satisfy fs1>fn2, and the second capacitor element 501b is designed so as to satisfy fs2<fn1.

Therefore, the charging-discharging capacitor 5 does not have a parallel resonance point in the driving frequency band and has a parallel resonance point in the noise frequency band. Dimensions of the wirings, the outflow-inflow portions, and the electrode portions are appropriately adjusted depending on the driving frequency band and the noise frequency band. Further, with N having a small value, a relatively low frequency band in the vicinity of the driving frequency can be covered as a noise frequency band.

Figure 13:
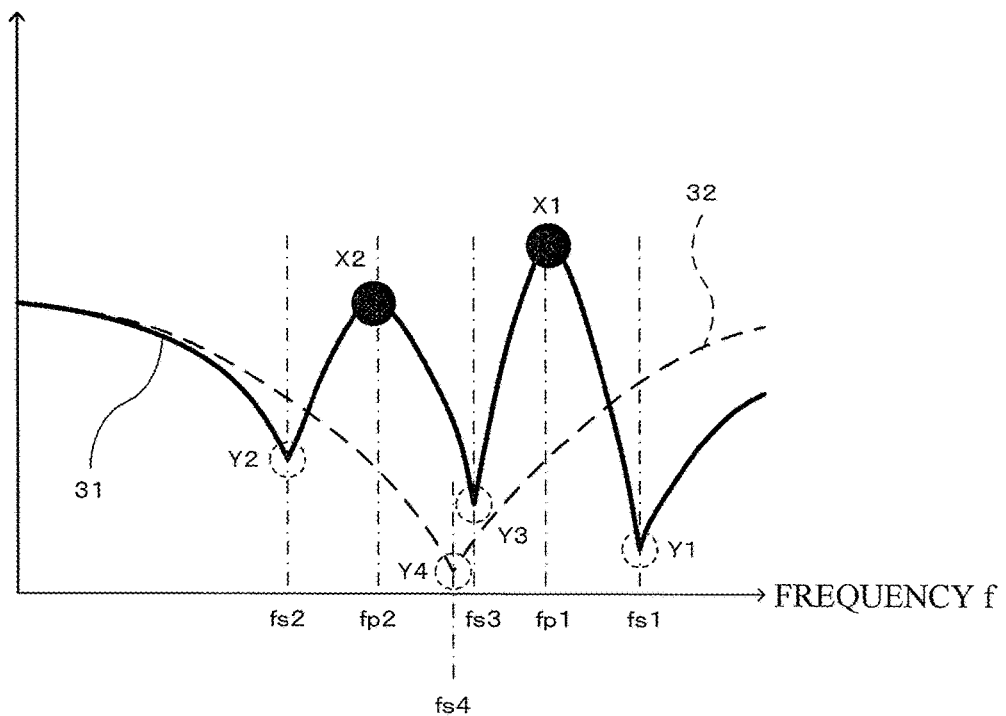
FIG. 13 is a graph for showing a difference in frequency characteristics of the absolute value of the impedance in the presence of a parallel resonance point of the charging-discharging capacitor illustrated in FIG. 10A and FIG. 10B and in the absence of the parallel resonance point of the charging-discharging capacitor illustrated in FIG. 10A and FIG. 10B.

FIG. 13 is a graph for comparing frequency characteristics of the absolute values of the impedances in the presence of a parallel resonance point of the charging-discharging capacitor according to Example 6 and in the absence of the parallel resonance point of the charging-discharging capacitor. Here, there are shown the impedance 31 of the charging-discharging capacitor 5 in the presence of the parallel resonance point and the impedance 32 of the charging-discharging capacitor 5 in the absence of the parallel resonance point. As shown in FIG. 13, compared with the impedance 32, the impedance 31 of Example 6 is large in the vicinity of the parallel resonance points X1 and X2. Therefore, compared with the impedance 32, the impedance 31 according to Example 6 can attenuate more noise in the noise frequency band in the vicinity of the parallel resonance points.

In this way, by connecting the three capacitor elements in parallel and arranging the outflow-inflow portions so as to be displaced from the center of the charging-discharging capacitor, the loop areas of the current paths to the respective capacitor elements are different from one another. Therefore, the inductance components at the time when the capacitor elements are viewed from the outflow-inflow portions are different from one another, and the charging-discharging capacitor does not have a parallel resonance point in the driving frequency band but has parallel resonance points in the noise frequency band. Therefore, the impedance becomes larger in the vicinity of the parallel resonance point. Therefore, noise in a desired frequency band including a relatively low frequency band in the vicinity of the driving frequency of the semiconductor switching elements can be reduced without the addition of a noise filter outside the apparatus.

Example 7 of Charging-Discharging Capacitor

Figure 14A:
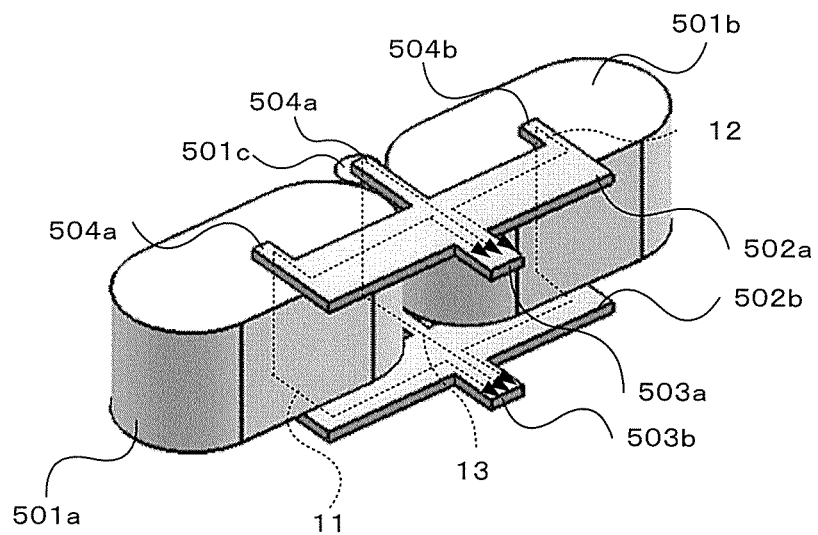
Figure 14B:
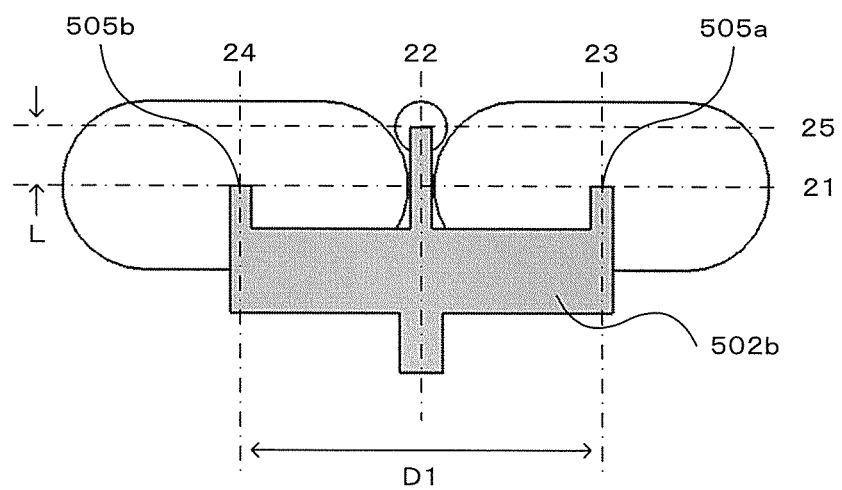

FIG. 14A is a perspective view of Example 7 of the charging-discharging capacitor used in the power conversion apparatus of the present invention and FIG. 14B is a bottom view of the charging-discharging capacitor.

The charging-discharging capacitor 5 illustrated in FIG. 14A and FIG. 14B is different from the charging-discharging capacitor 5 of Example 1 illustrated in FIG. 2A and FIG. 2B in that the first outflow-inflow portion 503a and the second outflow-inflow portion 503b are formed at the center of the charging-discharging capacitor 5, and in that the third capacitor element 501c having a small capacitance is arranged in a gap between the first capacitor element 501a and the second capacitor element 501b.

Further, the third capacitor element 501c is arranged at the point of intersection of the straight line 25 that is displaced, by the distance L, from the straight line 21 indicating the center of the first capacitor element 501a and the second capacitor element 501b as well as the straight line 22 indicating the center of the charging-discharging capacitor 5. In this case, by adjusting a wound length of a film of the third capacitor element 501c to be smaller than those of the other two capacitor elements, the capacitance of the third capacitor element 501c is reduced such that the capacitances are different from one another.

Therefore, the capacitance component at the time when the first capacitor element 501a is viewed from the junction points A and B and the capacitance component at the time when the second capacitor element 501b is viewed from the junction points A and B are the same, and the capacitance component at the time when the third capacitor element 501c is viewed from the junction points A and B becomes smaller than the capacitance components in the cases of the other two capacitor elements 501a and 501b. The inductance components at the time when the capacitor elements are viewed from the junction points A and B are assumed to be the same. Except for the structure of the charging-discharging capacitor 5, this Example 7 is similar to Example 1 illustrated in FIG. 2A and FIG. 2B, and thus, the description of the structure and the operation of the entire apparatus will be hereafter omitted.

When the series resonance frequency of the current path 11 to the first capacitor element 501a is represented by fs2, fs2 is expressed by Expression (2) above. The inductance components of the current paths 11 and 12 are the same and the capacitance components of the current paths 11 and 12 are the same, and thus, the series resonance frequency of the current path 12 to the second capacitor element 501b is also expressed by Expression (2) above. Further, at the time when the series resonance frequency of the current path 13 to the third capacitor element 501c is represented by fs1, fs1 is expressed by Expression (1) above.

Therefore, similarly to Example 1, the absolute value of the impedance of the charging-discharging capacitor 5 has characteristics similar to those of the impedance 31 shown in FIG. 5, i.e., has the series resonance point Y1 at the series resonance frequency fs1 on the side of the third capacitor element 501c, has the series resonance point Y2 at the series resonance frequency fs2 on the side of the first capacitor element 501a and on the side of the second capacitor element 501b, and has the parallel resonance point X1 at the parallel resonance frequency fp1 between fs2 and fs1.

Specifically, more noise in the noise frequency band can be attenuated in the vicinity of the parallel resonance point. The third capacitor element 501c is assumed to be arranged in an empty space, and thus, the capacitance thereof is extremely small compared with those of the other two capacitor elements 501a and 501b. Therefore, compared with the charging-discharging capacitors 5 of Examples 1 to 6 described above, the series resonance frequency fs1 becomes higher. Thus, the charging-discharging capacitor 5 of Example 7 can operate as a wider band noise filter.

In this case, the loop areas of the current paths 11 to 13 are the same, but the loop areas may be different from one another by adjusting the dimensions of the wirings, the outflow-inflow portions, and the electrode portions.

In this way, by arranging the third capacitor element 501c having the smaller capacitance component among the three capacitor elements in the gap between the first capacitor element 501a and the second capacitor element 501b, in addition to the effect of Examples 1 to 6, it is advantageous that the charging-discharging capacitor can function as a wider band noise filter without increasing the size.

Example 8 of Charging-Discharging Capacitor

Figure 15A:
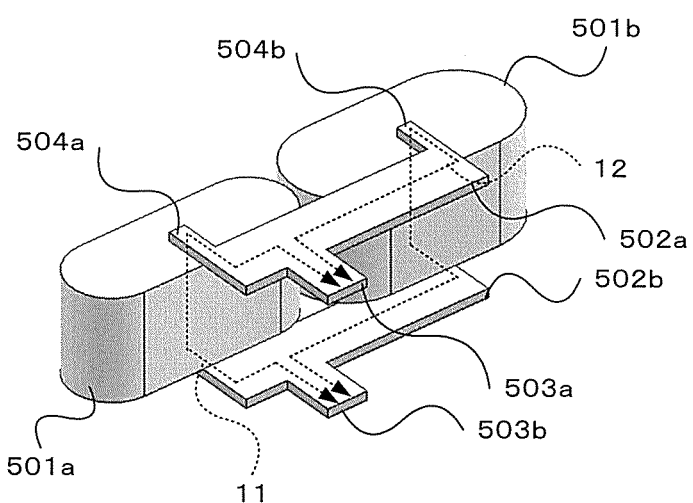
Figure 15B:
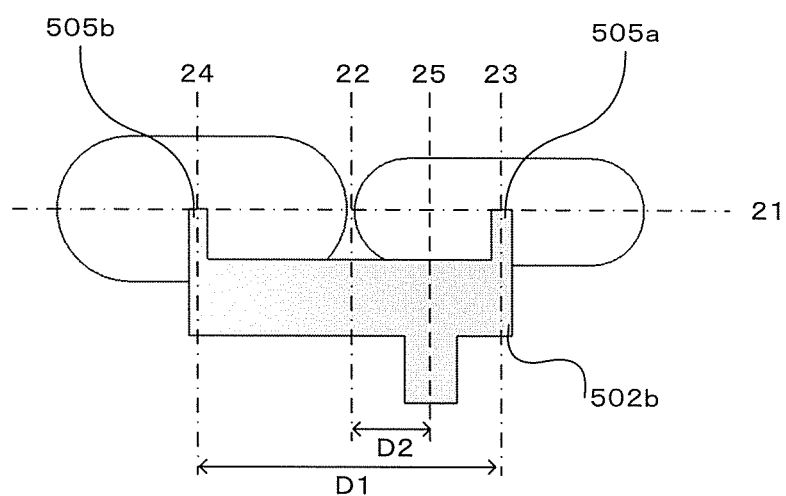

FIG. 15A is a perspective view of Example 8 of the charging-discharging capacitor used in the power conversion apparatus of the present invention and FIG. 15B is a bottom view of the charging-discharging capacitor.

The charging-discharging capacitor 5 illustrated in FIG. 15A and FIG. 15B is different from the charging-discharging capacitor 5 of Example 1 illustrated in FIG. 2A and FIG. 2B in that the capacitance of the first capacitor element 501a and the capacitance of the second capacitor element 501b are different from each other. In this case, by adjusting the wound length of the film material of the latter to be larger than that of the former, the capacitances of the capacitor elements are made different from each other. Specifically, the capacitance of the second capacitor element 501b is larger to some extent than that of the first capacitor element 501a. Therefore, the capacitance component at the time when the first capacitor element 501a is viewed from the junction points A and B and the capacitance component at the time when the second capacitor element 501b is viewed from the junction points A and B are different from each other, the latter capacitance component being larger than the former. In this case, as an example, the capacitances of the capacitor elements are made different from each other by making the wound lengths of the films different from each other. However, the film widths (distances between external electrodes), the film material permittivities, the film thicknesses (distances between internal electrodes), or the like may be different from each other.

Further, the loop area of the current path 11 from the junction points A and B corresponding to the first outflow-inflow portion 503a and the second outflow-inflow portion 503b, respectively, to the first capacitor element 501a and the loop area of the current path 12 from the junction points A and B to the second capacitor element 501b are different from each other, the latter loop area being larger than the former. Therefore, the inductance component at the time when the first capacitor element 501a is viewed from the junction points A and B and the inductance component at the time when the second capacitor element 501b is viewed from the junction points A and B are different from each other, the latter inductance component being larger than the former. While as an example, both the first outflow-inflow portion 503a and the second outflow-inflow portion 503b are arranged so as to be displaced from the straight line 22 by the distance D2, only any one of the first outflow-inflow portion 503a and the second outflow-inflow portion 503b may be arranged so as to be displaced from the straight line 22 by the distance D2. Specifically, insofar as the inductance component at the time when the first capacitor element 501a is viewed from the junction points A and B and the inductance component at the time when the second capacitor element 501b is viewed from the junction points A and B are different from each other, the first outflow-inflow portion 503a and the second outflow-inflow portion 503b may be arbitrarily arranged within the manufactural restraints of the capacitor.

Specifically, the capacitance component and the inductance component at the time when the second capacitor element 501b is viewed from the junction points A and B are larger than those at the time when the first capacitor element 501a is viewed from the junction points A and B. Therefore, similarly to Example 1, the absolute value of the impedance of the charging-discharging capacitor 5 has characteristics similar to those of the impedance 31 shown in FIG. 5, i.e., has the series resonance point Y1 at the series resonance frequency fs1 on the side of the first capacitor element 501a, has the series resonance point Y2 at the series resonance frequency fs2 on the side of the second capacitor element 501b, and has the parallel resonance point X1 at the parallel resonance frequency fp1 between fs2 and fs1. However, compared with the cases of the charging-discharging capacitors 5 of Examples 1 to 4, the difference between fs1 and fs2 becomes larger.

In this way, by making the capacitance components at the time when the capacitor elements are viewed from the outflow-inflow portions different from each other and making the inductance components at the time when the capacitor elements are viewed from the outflow-inflow portions different from each other, the difference in frequency between the series resonance points is increased. Thus, in addition to the effect of Examples 1 to 4, the charging-discharging capacitor can operate as a wider band noise filter.

Other Modified Examples of Charging-Discharging Capacitor

Other than the cases of Examples 1 to 8 described above, for example, by adjusting at least one of cross sections of the plurality of first electrode portions and cross sections of the plurality of second electrode portions different from each other, the loop areas of the current paths to the respective capacitor elements can be made different from each other. Therefore, the inductance components at the time when the capacitor elements are viewed from the outflow-inflow portions differ from each other, and the charging-discharging capacitor does not have a parallel resonance point in the driving frequency band but has a parallel resonance point in the noise frequency band. Thus, the impedance can be large in the vicinity of the parallel resonance point. Therefore, an effect similar to those described above can be obtained.

While in the cases of Examples 1 to 8 described above, two or three capacitor elements are used, even when four or more capacitor elements are used, a similar effect can be obtained for reasons similar to those described above.

Further, while in the cases of Examples 1 to 8 described above, a film capacitor is applied to the charging-discharging capacitor, other ordinary capacitors such as an electrolytic capacitor and a ceramic capacitor may also be used. Further, capacitors of a plurality of kinds such as a combination of a film capacitor and a ceramic capacitor may be connected in parallel. Further, it goes without saying that when a stacked capacitor is used, the capacitances may be made different from each other by causing the numbers of stacked layers to differ from each other.

Further, while in the cases of Examples 1 to 8 described above, the capacitor elements are arranged between the first wiring and the second wiring, the first wiring and the second wiring may be stacked via an insulator such as insulating paper therebetween and the capacitors may be arranged on or under the insulator.

Further, while in the cases of Examples 1 to 8 described above, the plurality of first electrode portions are formed on the first wiring and the plurality of second electrode portions are formed on the second wiring, the electrode portions may be formed of a conductive material different from that of the wirings and one ends thereof may be connected to the wirings and another ends thereof may be connected to the capacitor elements, respectively.

Still further, while in the cases of Examples 1 to 8, the capacitor elements are arranged so that electrode surfaces thereof are arranged in a vertical direction, the electrode surfaces may be arranged in a horizontal direction.

Further, while in the cases of Examples 1 to 8, each of the semiconductor switching elements 2a to 2d includes an IGBT and a diode, a MOSFET or a JFET may be substituted for the IGBT. When a MOSFET is used, a MOSFET body diode may be substituted for the diode. Further, each of the semiconductor switching elements 2a to 2d may be formed using a wide band gap semiconductor having a larger band gap than silicon, for example, silicon carbide (SiC), a gallium nitride-based material, or diamond.

It goes without saying that the present invention is not limited to Examples 1 to 8 described above and encompasses all possible combinations thereof.

What is claimed is:

1. A power conversion apparatus, comprising:
    a plurality of semiconductor switching elements;
    a reactor;
    a low voltage-side capacitor;
    a high voltage-side capacitor;
    a charging-discharging capacitor; and
    a control unit configured to control driving of the plurality of semiconductor switching elements at a set driving frequency,
    the plurality of semiconductor switching elements comprising:
    a first semiconductor switching element including a first terminal connected to a negative electrode of the low voltage-side capacitor;
    a second semiconductor switching element including a first terminal connected to a second terminal of the first semiconductor switching element and a second terminal connected to a positive electrode of the low voltage-side capacitor via the reactor;
    a third semiconductor switching element including a first terminal connected to the second terminal of the second semiconductor switching element; and
    a fourth semiconductor switching element including a first terminal connected to a second terminal of the third semiconductor switching element and a second terminal connected to a positive electrode of the high voltage-side capacitor, the charging-discharging capacitor being connected between a junction point of the first semiconductor switching element with the second semiconductor switching element and a junction point of the third semiconductor switching element with the fourth semiconductor switching element, the charging-discharging capacitor having a plurality of capacitor elements connected in parallel via a first wiring and a second wiring, at least one of inductance components and capacitance components of the plurality of capacitor elements at the time when viewed from outflow-inflow portions of the first wiring and the second wiring being different from each other such that the charging-discharging capacitor has no parallel resonance point in a driving frequency band but has a parallel resonance point in a noise frequency band.

2. The power conversion apparatus according to claim 1, wherein the inductance components being different from each other is due to a difference in loop areas of current paths between the plurality of capacitor elements and the outflow-inflow portions of the first wiring and the second wiring.

3. The power conversion apparatus according to claim 2, wherein the difference in the loop areas is due to at least one of the outflow-inflow portions of the first wiring and the second wiring being displaced from a center between the plurality of capacitor elements.

4. The power conversion apparatus according to claim 2, wherein the difference in the loop areas is due to a difference in lengths of electrode portions formed in the first wiring and the second wiring and connected to the plurality of capacitor elements, the difference in the lengths being in at least one of the first wiring or the second wiring.

5. The power conversion apparatus according to claim 3, wherein the difference in the loop areas is due to a difference in lengths of electrode portions formed in the first wiring and the second wiring and connected to the plurality of capacitor elements, the difference in the lengths being in at least one of the first wiring or the second wiring.

6. The power conversion apparatus according to claim 2, wherein the difference in the loop areas is due to at least one of electrode portions formed in the first wiring and the second wiring and connected to the plurality of capacitor elements being displaced from a center of the capacitor elements connected.

7. The power conversion apparatus according to claim 3, wherein the difference in the loop areas is due to at least one of electrode portions formed in the first wiring and the second wiring and connected to the plurality of capacitor elements being displaced from a center of the capacitor elements connected.

8. The power conversion apparatus according to claim 4, wherein the difference in the loop areas is due to at least one of electrode portions formed in the first wiring and the second wiring and connected to the plurality of capacitor elements being displaced from a center of the capacitor elements connected.

9. The power conversion apparatus according to claim 5, wherein the difference in the loop areas is due to at least one of electrode portions formed in the first wiring and the second wiring and connected to the plurality of capacitor elements being displaced from a center of the capacitor elements connected.

10. The power conversion apparatus according to claim 1, wherein the inductance components being different from each other is due to a difference in cross sections of at least one of electrode portions formed in the first wiring and the second wiring and connected to the plurality of capacitor elements.

11. The power conversion apparatus according to claim 1, wherein the capacitance components being different from each other is due to a difference in material permittivities, thicknesses, widths, wound lengths, electrolyte solutions, or a number of stacked layers of at least one of the plurality of capacitor elements.

12. The power conversion apparatus according to claim 1, wherein the inductance components being different from each other is due to three capacitor elements among the plurality of capacitor elements being arranged on a straight line, the first wiring and the second wiring being provided with electrode portions formed thereon correspondingly to the capacitor elements, and the outflow-inflow portions being formed at a center of the first wiring and the second wiring.

13. The power conversion apparatus according to claim 1, wherein the inductance components being different from each other is due to three capacitor elements among the plurality of capacitor elements being arranged on a straight line, the first wiring and the second wiring being provided with electrode portions formed thereon correspondingly to the capacitor elements, and the outflow-inflow portions being displaced from a center of the first wiring and the second wiring.

14. The power conversion apparatus according to claim 1, wherein the capacitance components being different from each other is due to the plurality of capacitor elements comprising two capacitor elements and one capacitor element between the two capacitor elements, the one capacitor element having a capacitance component smaller than capacitance components of the two capacitor elements, and the first wiring and the second wiring being provided with electrode portions formed thereon correspondingly to the capacitor elements.

* * * * *